United States Patent [19]

Espenschied et al.

[11] 3,793,898
[45] Feb. 26, 1974

[54] GEAR SHIFTING ASSEMBLY FOR CHANGE-SPEED TRANSMISSIONS

[75] Inventors: Helmut Espenschied, Ludwigsburg; Georg Rothfuss, Ditzingen; Joseph Sauer, Schwieberdingen, all of Germany

[73] Assignee: Robert Bosch GmbH, Stuttgart, Germany

[22] Filed: May 8, 1972

[21] Appl. No.: 250,956

[30] Foreign Application Priority Data
May 18, 1971  Germany............................ 2124624

[52] U.S. Cl. .................................... 74/335, 74/364
[51] Int. Cl. ........................... F16h 5/06, F16h 3/08
[58] Field of Search.... 74/335, 364, 753; 192/109 F

[56] References Cited
UNITED STATES PATENTS

| | | | |
|---|---|---|---|
| 3,489,100 | 1/1970 | Hill .................................. | 91/391 X |
| 2,931,237 | 4/1960 | Backus................................ | 74/335 |
| 2,974,766 | 3/1961 | Perkins et al. .................... | 74/335 X |
| 3,570,636 | 3/1971 | Franz et al. ..................... | 74/335 UX |
| 3,664,470 | 5/1972 | Beech et al. ..................... | 74/335 X |

Primary Examiner—Arthur T. McKeon
Attorney, Agent, or Firm—Michael S. Striker

[57] ABSTRACT

A gear shifting assembly for change-speed transmissions of the type having several shifting members which are actuatable to thereby set the transmission to a desired speed position employs two fluid-operated motors the first of which can move a displacing member into register with a selected shifting member and the second of which thereupon actuates the selected shifting member by way of the displacing member. The admission of a pressurized fluid to and the evacuation of fluid from the cylinders of the motors is regulated by a system of valves which are operated by pressurized fluid or by an electronic control unit.

37 Claims, 6 Drawing Figures

GEAR SHIFTING ASSEMBLY FOR CHANGE-SPEED TRANSMISSIONS

BACKGROUND OF THE INVENTION

The present invention relates to improvements in change-speed transmissions in general, and more particularly to improvements in means for changing the speed positions of transmissions which are utilized in automotive vehicles or the like. Still more particularly, the invention relates to improvements in so-called gear-shift assisters or gear shifting assemblies which can be used to select and thereupon engage a selected speed gear of a change-speed transmission.

One known mechanism discloses a hydraulically or pneumatically operated gear shifting assembly for change-speed transmissions wherein a first motor serves to select a desired speed position and a second motor serves to engage the selected speed gear. The gear shifting assembly further comprises a system of valves which regulate the admission and evacuation of fluid from the motors. The valves must be operated by hand so that the assembly cannot be used in connection with automatic change-speed transmissions.

SUMMARY OF THE INVENTION

An object of the invention is to provide a novel and improved gear shifting assembly which can be used to select the speed positions of an automatic change-speed transmission, particularly a transmission for automotive vehicles.

Another object of the invention is to provide a gear shifting assembly which can be operated by remote control and which can be designed to control the operation of change-speed transmissions with any desired or practical number of different speed positions.

A further object of the invention is to provide the gear shifting assembly with novel and improved fluid-operated motors for selection and actuation of gear shifting members in an automatic change-speed transmission.

An additional object of the invention is to provide the gear shifting assembly with a novel and improved system of valves which allow for automatic selection and actuation of shifting members.

Still another object of the invention is to provide a gear shifting assembly which, in the event of emergency, can be actuated by hand so as to allow for selection of desired speed positions even if the means for supplying a pressurized hydraulic or pneumatic fluid happens to be out of commission of if one or more valves of the valve system which controls the flow of fluid to and from the motors are defective or fail to operate properly due to exhaustion or failure of the source of electrical energy.

The improved gear shifting assembly can be used to control a change-speed transmission of the type having a plurality of shifting members which are actuatable to thereby set the transmission into different speed positions. The gear shifting assembly comprises axially and-/or angularly movable displacing means (such as a coupling element or a forked hub) which is movable into register with each shifting member of the transmission, a fluid-operated selector motor including first cylinder means and first piston means movable in the first cylinder means between a plurality of different angular or axial positions to thereby effect a movement of the displacing means into register with selected shifting members, fluid-operated actuating motor means having second cylinder means and second piston means movable with reference to the second cylinder means from a normal or neutral position to at least one but preferably two operative positions to thereby actuate the selected shifting member by way of the displacing means, at least one source of pressurized gaseous or liquid fluid, and automatic control means preferably including an electronic control unit for remote-control operated valve means serving to regulate the flow of fluid which is furnished by the source or sources to and from the first and second cylinder means.

The first cylinder means may be provided with two fluid-admitting pressure ports located at the opposite sides of the first piston means and with a plurality of fluid-discharging ports which are located in the path of movement of the first piston means. The valve means then includes a directional control valve which is interposed between the source of pressurized fluid and the pressure ports and is arranged to automatically admit pressurized fluid to the pressure port at the higher pressure side of the first piston means. The valve means further includes normally closed electromagnetic shutoff valves for the fluid-discharging ports whereby the first piston means automatically moves to a position in which it seals that discharging port which was free to permit an outflow of fluid from the first cylinder means in response to opening of the respective shutoff valve. As a result of its movement to such position, the first piston means causes the displacing means to move into register with a selected shifting member which is thereupon caused to perform an angular or translatory movement in response to movement of the second piston means from its neutral position.

The first and second piston means are preferably movable in planes which are at least substantially normal to each other, and each piston means may comprise at least one double-acting piston.

The valve means of the control means may comprise normally closed safety valve means interposed between the source of pressurized fluid and the two motors.

The novel features which are considered as characteristic of the invention are set forth in particular in the appended claims. The improved gear shifting assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
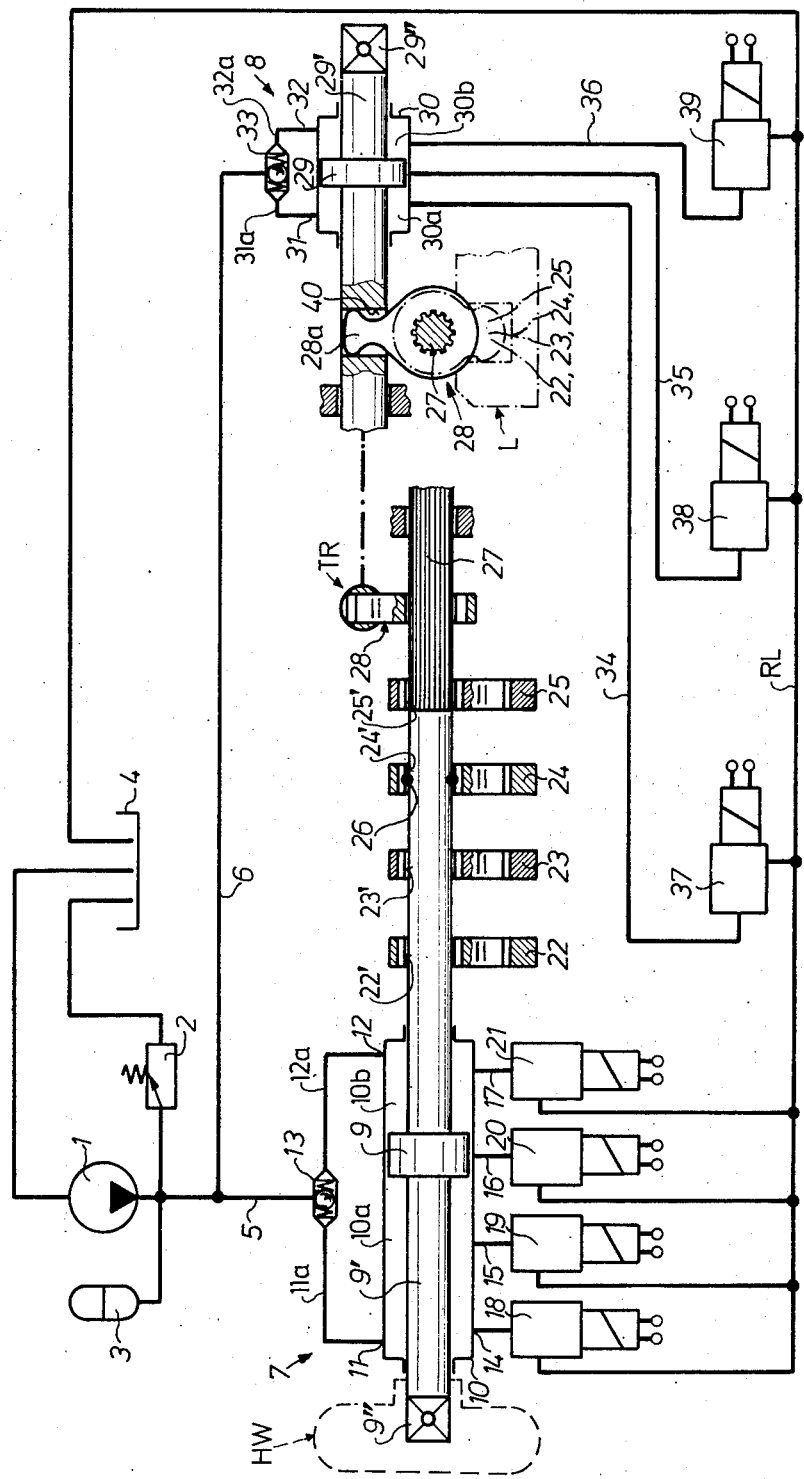
FIG. 1 is a diagrammatic partly sectional view of a gear shifting assembly for change-speed transmissions which embodies one form of the invention.

Referring first to FIG. 1, there is shown a gear shifting assembly which comprises three main components, namely, a source of pressurized fluid, a speed selecting or preshifting motor with associated valves, and a shifting or actuating motor with associated valves. The assembly further comprises an electronic control unit which produces shifting pulses for setting the change-speed transmission to a selected speed position. The details of the electronic control unit form no part of the present invention.

The gear shifting assembly of FIG. 1 employs a source of pressurized hydraulic fluid (e.g., oil) which includes a pump 1 driven by an electric motor (not shown) and drawing fluid from a reservoir or tank 4. The pressure of fluid which is discharged by the pump 1 is limited by a relief valve 2 which opens a bypass to the reservoir 4 when the fluid pressure in a high pressure line 5 reaches a predetermined maximum permissible value. The source of pressurized fluid further comprises a suitable accumulator 3 which is connected with the high pressure line 5 and serves to compensate for eventual fluctuations in fluid pressure as well as to constitute an auxiliary source of pressurized fluid.

The high pressure line 5 connects the outlet of the pump 1 and the accumulator 3 with a fluid-operated speed selecting motor 7 through the intermediary of a specially designed directional control valve 13. A branch 6 of the high pressure line 5 connects the accumulator 3 and the outlet of the pump 1 with a fluid-operated shifting or actuating motor 8, again by way of a specially designed directional control valve 33 similar to or identical with the valve 13.

The speed selecting motor 7 (hereinafter called selector motor for short) comprises a hydraulic actuator cylinder 10 for a double-acting reciprocable actuator piston 9 which is connected with an elongated piston rod 9'. The latter extends beyond and is sealingly guided in both ends of the cylinder 10. Two pressure ports 11, 12 which are closely adjacent to the respective ends of the cylinder 10 at the opposite sides of the piston 9 are connected with the directional control valve 13 by way of conduits 11a, 12a and serve to admit pressurized fluid to the respective cylinder chambers 10a and 10b. The construction of the directional control valve 13 is such that it automatically connects the high pressure line 5 with that one of the cylinder chambers 10a, 10b wherein the pressure is or can be higher than in the other chamber. A directional control valve which can be utilized in the assembly of FIG. 1 to control the flow of pressurized fluid from the high pressure lines 5, 6 into the motors 7 and 8 is disclosed, for example, in the copending application, Ser. No. 217,061 of Espenschied et al., Jan. 11, 1972. An electronic unit for the valves of the type shown in FIGS. 1 to 6 is copending in the application, Ser. No. 162,339, filed on July 14, 1971.

The actuator cylinder 10 of the selector motor 7 is further provided with four fluid-discharging return ports 14, 15, 16 and 17 which are respectively controlled by normally closed electromagnetic shutoff valves 18, 19, 20 and 21 and are located in the path of movement of the piston 9 between the pressure ports 11, 12. The return ports 14–17 can admit fluid into the reservoir 4 by way of a return line RL.

The right-hand end of the piston rod 9' extends well beyond the respective end of the cylinder 10 and is rotatable in the openings of bores 22', 23', 24', 25' of four shifting members or fingers 22, 23, 24, 25 which form part of a change-speed transmission for automotive vehicles. This end portion of the piston rod 9' is provided with at least one but preferably more than one coupling or displacing element 26 which can establish a torque-transmitting connection between the piston rod 9' and a selected shifting member or finger when the displacing element 26 is moved into the respective bore 22', 23', 24' or 25'. Such axial shifting of the element 26 takes place in response to movement of the actuator piston 9 toward the pressure port 11 or 12 of the cylinder 10 in the selector motor 7. For example, the displacing element 26 may be provided with one or more external splines which can enter complementary grooves provided in the fingers 22, 23, 24 and 25 so that the respective finger is then compelled to share the angular movements of the piston rod 9'.

The rightmost portion of the piston rod 9' constitutes a splined shaft 27 which can be rotated by a tilting box here shown as a one-armed lever 28. The latter has internal grooves to receive the splines of the shaft 27 so as to allow the piston rod 9' to move axially to the extent which is necessary to move the displacing element 26 into register and torque-transmitting engagement with the finger 22, 23, 24 or 25. The lever 28 can be pivoted by a second piston rod 29' which forms part of the actuating motor 8. The piston rod 29' is normal to and crosses in space with the piston rod 9' (see the true position of the piston rod 29' as shown at TR in FIG. 1). The right-hand portion of FIG. 1 shows the axis of the piston rod 29' in the plane of the drawing and the axis of the splined shaft 27 at right angles to such plane merely for the sake of clarity.

Each of the fingers 22, 23, 24, 25 is articulately connected with a shifter fork (not shown) by one or more links L, and each shifter fork straddles a sleeve or collar which can shift the corresponding speed gear of the change-speed transmission in an automotive vehicle.

The actuating motor 8 comprises an actuator cylinder 30 for double-acting reciprocable actuator piston 29 which is rigid with the aforementioned piston rod 29'. The piston rod 29' extends beyond and is sealingly guided in both ends of the cylinder 30. The latter has two pressure ports 31, 32 which are connected with the directional control valve 33 by conduits 31a, 32a. Furthermore, the cylinder 30 is provided with three fluid-discharging return ports 34, 35, 36 which are respectively controlled by electromagnetic shutoff valves 37, 38, 39 and can discharge fluid into the return line RL which can convey such fluid back into the reservoir 4.

That portion of the piston rod 29' which is adjacent to the lever 28 has a recess or slot 40 for a suitably rounded (e.g., substantially spherical) end portion 28a of this lever so that the latter can be pivoted clockwise or counterclockwise, depending upon whether the actuator cylinder 30 receives pressurized fluid by way of the pressure port 31 or 32.

The left-hand end portion 9'' of the piston rod 9', as viewed in FIG. 1, is of polygonal outline and is provided with a diametrically extending opening or bore to facilitate the attachment of a wheel or analogous manually operated means HW (indicated by broken lines) which allows for manually induced movements of the displacing element 26 in the event of a failure of the hydraulic system. The wheel HW need not be permanently mounted on the end portion 9''; it can be attached only in an emergency. A similar polygonal or facetted right-hand end portion 29'' of the piston rod 29' can also receive a wheel or analogous manually operated moving means which can be manipulated to pivot the lever 28 and to thus turn the piston rod 9'. For example, each of the end portions 9'', 29'' can be provided with one or more flats. A gear shifting assembly for change-speed transmission is disclosed, for example, in U.S. Pat. No. 3,522,867.

The Operation

When the drive of the vehicle transmits to the electronic control unit a signal to shift into another gear, the control unit automatically initiates a series of operations including disengaging the clutch (not shown), disengaging the previously used speed gear, selecting the desired speed gear, electronic synchronization, engaging the selected gear, and engaging the clutch.

The selection and engagement of the desired speed gear are carried out by the assembly of FIG. 1 as follows. The electronic control unit furnishes a signal which opens one of the electromagnetic valves 18–21, for example, the shutoff valve 19. The valves 18–21 are normally closed so that the return ports 14–17 of the actuator cylinder 10 are sealed from the return line RL. When the shutoff valve 19 opens, the return port 15 is free to communicate with the reservoir 4 and the pressure in the cylinder chamber 10a decreases. This causes the directional control valve 13 to connect the high pressure line 5 with the right-hand chamber 10b by way of the conduit 12a and pressure port 12 whereby the actuator piston 9 moves in a direction to the left, as viewed in FIG. 1, and causes the displacing element 26 to enter the bore 23' of the shifting member or finger 23 when the piston 9 reaches and seals the return port 15. The axial movement of the piston 9 in a direction to the left is braked by the rising fluid pressure in the cylinder chamber 10a so that the piston rod 9' is gradually decelerated while moving its displacing element 26 into register with the finger 23. The piston 9 comes to rest when it seals the return port 15 because the pressure in the chamber 10b then equals the pressure in the chamber 10a. This causes the valve member of the directional control valve 13 to assume a neutral position in which the high pressure line 5 communicates with both chambers of the cylinder 10 to thereby insure that the piston 9 remains in the selected position of sealing engagement with the return port 15 in which the piston rod 9' can transmit torque to the finger 23. This completes the speed position selecting operation.

The electronic control unit thereupon transmits a signal to the shutoff valve 37 or 39 so that the selected valve opens and connects the respective return port 34 or 36 with the return line RL. This causes the directional control valve 33 to admit pressurized fluid into the cylinder chamber 30a or 30b so that the piston rod 29' moves axially and pivots the lever 28 to thereby turn the piston rod 9' by way of the splined shaft 27. The displacing element 26 actuates the finger 23 which causes the associated link L to move the corresponding fork with the result that the desired speed position is set and the corresponding speed gear is ready to drive the main or output shaft of the change-speed transmission.

The double-acting piston 9 of the selector motor 7 is movable in a plane which is at least substantially normal to the plane of movement of the double-acting piston in the actuating motor 8. The piston 29 is movable between the illustrated neutral position in which it seals the return port 35 and two operative positions in which it respectively seals the return ports 34, 36. The neutral position is located between the two operative positions. The piston 29 will move to its right-hand operative position if a selected link L is to move in a direction to the left, as viewed in FIG. 1. If a selected link L must be moved in a direction to the right, the piston 29 is moved to its left-hand operative position.

An important advantage of the improved gear shifting assembly is that its electromagnetic valves can be actuated by remote control so that the changes in speed positions of the transmission including the shifting members 22–25 can be brought about in automatic response to signals furnished by the electronic control unit. Such mode of operation is less tiresome to the driver of the vehicle and the setting of transmission to a desired speed position takes up much less time than in the transmission which is controlled by the aforementioned gear shifting assembly utilizing a system of manually operated valves.

It was found that the improved gear shifting assembly can be used with particular advantage to control change-speed transmissions having a relatively large number of speed positions, for example, six forward speeds and one reverse speed.

If the pressurized fluid is a gas, e.g., air, the ports 14–17 and 34–36 can discharge spent fluid to the atmosphere. Oil has been found to be particularly suited for use as a pressurized medium in the gear shifting assembly of the present invention.

The shifting members 22–25 (whose number may exceed or is less than four) normally serve to transmit motion to shifting sleeves or collars which, in turn, serve to shift speed gears in a change-speed transmission. Such speed gears are normally in permanent mesh with the gears of a countershaft in the transmission. When the displacing element 26 is moved by the piston rod 29' in response to movement of the double-acting piston 29 to one of its operative positions, the selected speed gear transmits torque to the output shaft of the transmission. The transmission of torque can take place by way of a suitable claw clutch. A sleeve or collar is normally designed in such a way that it can connect either one of two speed gears with the output shaft of the transmission and is straddled by the prongs of a fork which is shiftable lengthwise of a shaft or is rotatable by a coupling rod. In each instance, the forks are preferably grouped together so that they can be moved by a control lever of the vehicle. Such control lever corresponds to the piston rod 9' which can select the desired speed position. The control lever is first moved to a neutral position and the selected sleeve is thereupon shifted in the one or the other direction to thereby move the corresponding speed gear to its operative position.

Such construction of the improved gear shifting assembly that the piston in the cylinder of the actuating motor moves in a plane which is normal to the plane of movements of piston in the actuating motor is desirable because of the presently preferred design of change-speed transmissions wherein the selection of a desired speed position takes place in response to movement of the selector means in a first direction and the actual engagement takes place in response to movement in a second direction which is normal to the first direction.

Figure 2:
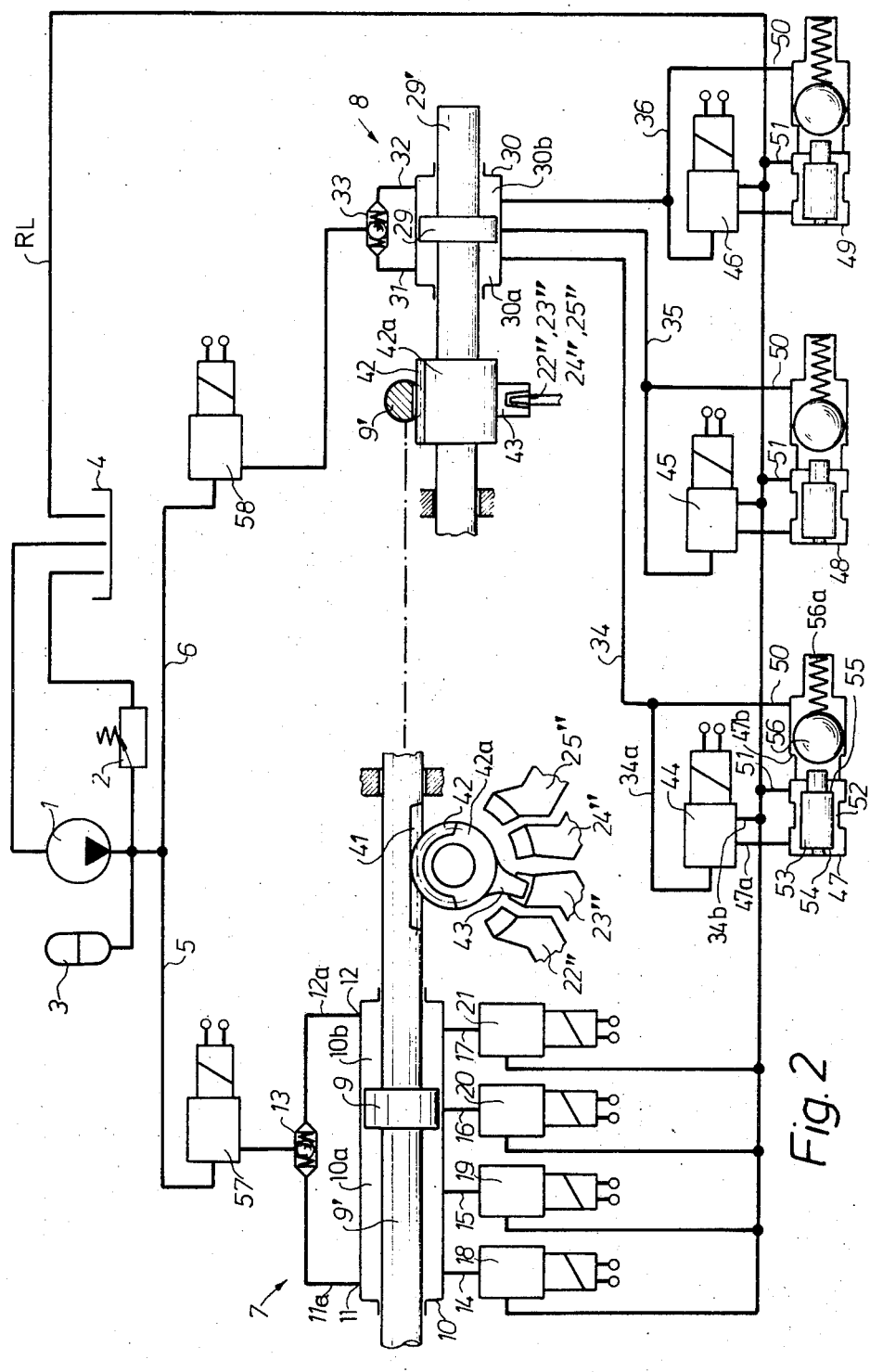
FIG. 2 is a similar view of a second gear shifting assembly.

Those parts of the assembly shown in FIG. 2 which are identical with or clearly analogous to the corresponding parts of the assembly of FIG. 1 are denoted by similar reference characters. The gear shifting assembly of FIG. 2 also comprises a source of pressurized fluid which includes the aforediscussed parts 1, 2, 3 and 4. The high pressure lines 5 and 6 respectively serve to connect the outlet of the pump 1 with directional control valves 13 and 33 which are connected with the motors 7 and 8 in the same way as described in connection with FIG. 1. The main difference between the assemblies of FIGS. 1 and 2 is that the second assembly employs different displacing means for transmitting motion from the piston rod 9' of the actuator cylinder 10 to the shifting member or finger 22'', 23'', 24'' or 25''. The right-hand portion of the piston rod 9' (as viewed in FIG. 2) is provided with a longitudinally extending toothed rack 41 which meshes with a gear segment 42 provided on a displacing hub or sleeve 42a which is rotatable and movable axially with the piston rod 29' of the double-acting piston 29 in the actuator cylinder 30. The displacing hub 42a is further provided with a fork 43 which can be brought into register with a pallet on the finger 22'', 23'', 24'' or 25'', depending on the angular position of the hub 42a (which is a function of the axial position of the piston rod 9'). The fingers 22''-25'' can be pushed and/or pulled to transmit motion to links and shifter forks in the same way as described in connection with FIG. 1. These fingers receive translatory motion in response to axial movement of the piston rod 29'. The piston 29 may but need not rotate with the piston rod 29'; all that counts is that the piston rod 29' shares all axial movements of the piston 29 relative to the cylinder 30.

As an optional precautionary or safety measure, the assembly of FIG. 2 further comprises two electromagnetic safety valves 57, 58 which are respectively installed in the high pressure lines 5 and 6 upstream of the respective directional control valves 13 and 33. Each of these safety valves has a valve element movable between two positions in one of which it connects the high pressure line 5 or 6 with the respective directional control valve 13 or 33 and in the other of which the respective high pressure line is connected with the reservoir 4.

The assembly of FIG. 2 further employs modified shutoff valve means for controlling the evacuation of fluid from the chamber 30a or 30b of the actuator cylinder 30 of the actuating motor 8. This valve means comprises three check valves 47, 48, 49 which respectively control the flow of fluid from the discharging ports 34, 35, 36 to the return line RL and three normally deenergized electromagnetic pilot valves 44, 45, 46 which respectively control the check valves 47, 48, 49. When the solenoid of the pilot valve 44 is deenergized, the latter seals a branch conduit 34a which connects the discharging port 34 with the return line RL by way of a conduit 34b. At the same time, the pilot valve 44 connects the return line RL with a chamber 54 at the left-hand end of a plunger 53 in the body of the check valve 47. Such connection is established by way of a conduit 47a. A median portion of the plunger 53 is sealingly guided in a portion 52 of the body of the check valve 47 which is provided with an outlet 51 connecting the return line RL with a chamber 55 at the right-hand end of the plunger 53. A valve seat 47b in the body of the check valve 47 is normally engaged by a spherical valve element 56 which is biased against the seat 47b by a helical spring 56a. This means that the outlet 51 is normally sealed from an outlet 50 which is connected with the discharging port 34.

When the pilot valve 44 is energized, it connects the branch conduit 34a with the chamber 54 by way of the conduit 47a and seals the conduit 34a from the conduit 34b and hence from the return line RL. If the double-acting actuator piston 29 is thereupon moved in a direction to the left, as viewed in FIG. 2, it expels fluid from the cylinder chamber 30a so that the pressure in the port 34, branch conduit 34a and chamber 54 rises sufficiently to shift the plunger 53 in a direction to the right so that the smaller-diameter cylindrical extension of this plunger moves the spherical valve element 56 away from the seat 47b and allows fluid to flow from the discharge port 34, through the inlet 50, around the valve element 56, through the seat 47b and outlet 51, and into the return line RL.

The construction of the check valves 48, 49 and pilot valves 45, 46 is respectively identical with that of the just described valves 47 and 44.

The operation of the assembly of FIG. 2 is analogous to that of the assembly which is shown in FIG. 1. When the electronic control unit receives a signal to effect a change in the speed position of the change-speed transmission in the automotive vehicle, one of the shutoff valves 18-21 is opened simultaneously with the safety valve 57 so that the high pressure line 5 can deliver pressurized fluid to the directional control valve 13. One of the discharge ports 14-17 connects the respective chamber 10a or 10b of the actuator cylinder 10 with the return line RL. The piston rod 9' then moves axially so as to rotate the fork 43 of the displacing hub 42a on the piston rod 29' into register with one of the shifting members or fingers 22''-25''. During such selection of the speed position, double-acting piston 29 in the actuator cylinder 30 dwells in the illustrated neutral position (this also holds true for the piston 29 of FIG. 1). The piston 29 has been moved to such neutral position in response to opening of the pilot valve 45 together with at least one of the pilot valves 44, 46 so that the opening of the safety valve 58 in the high pressure line 6 resulted in a movement of the piston 29 to the neutral position prior to a new speed selection.

The safety valves 57, 58 are opened by remote control prior to selection of a new speed position. When the speed selection by way of the motor 7 is completed, i.e., when the prongs of the fork 43 straddle the pallet on the selected shifting member or finger 22'', 23'', 24'' or 25'', the electronic control unit energizes one of the valves pilot 44, 46 to cause the piston rod 29' to move axially and to actuate the selected finger by way of the displacing hub 42a so as to engage the selected speed gear of the change-speed transmission. The solenoids of the safety valves 57, 58 are thereupon deenergized and the assembly is ready for the next speed selecting and actuating operation.

Figure 3:
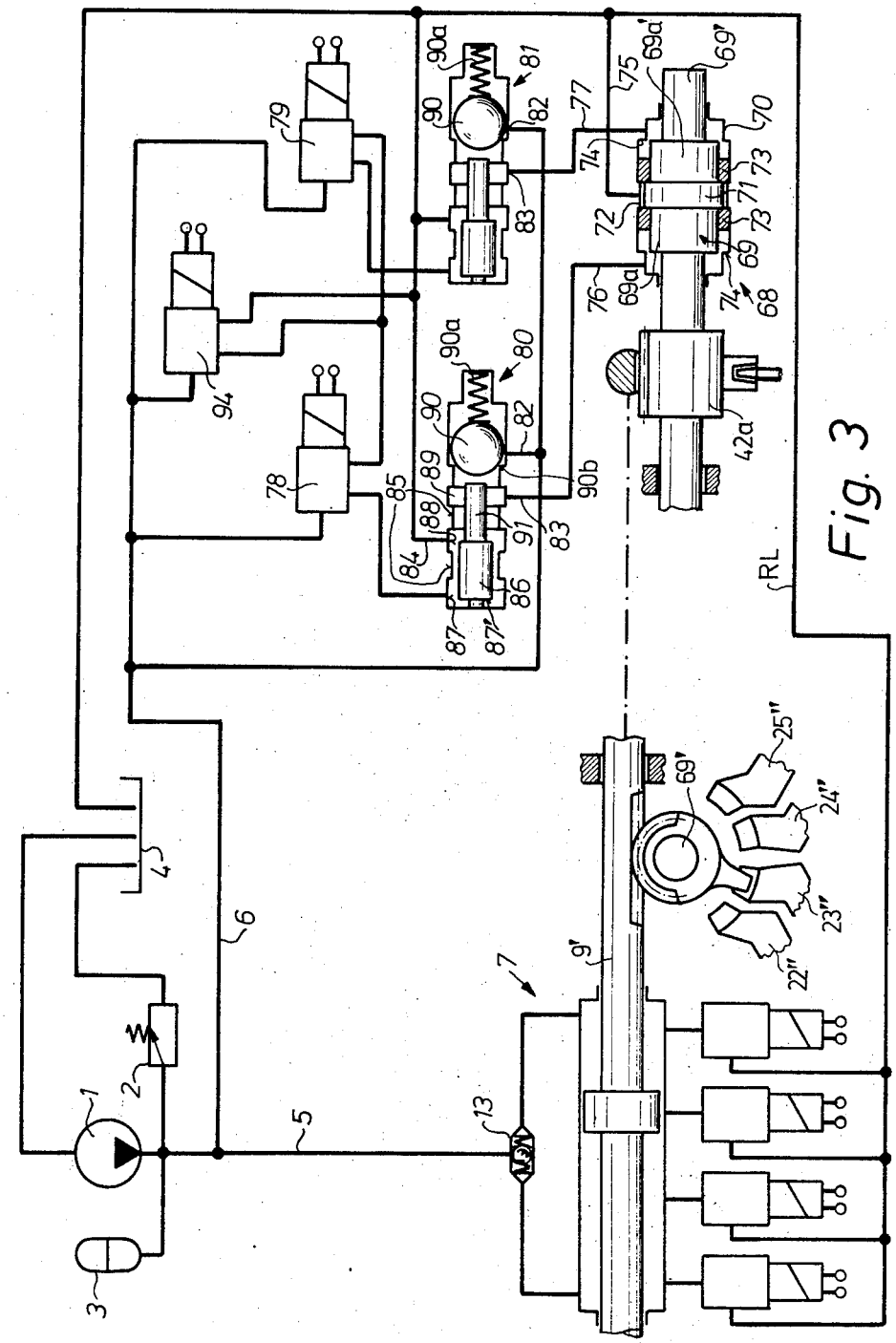
FIG. 3 is a similar view of a third gear shifting assembly.

The assembly of FIG. 3 employs a different shifting or actuating motor 68. The motor 7 is identical with the similarly numbered motor of FIG. 2.

The actuating motor 68 comprises a double-acting actuator piston 69 having a piston rod 69' which is guided in and extends beyond both ends of the actuator cylinder 70. The piston 69 does not come into actual contact with the cylinder 70 and its central portion constitutes a larger-diameter entraining collar 71 which is located exactly midway between the axial ends of the piston. The central portion 72 of the cylinder 70 has a reduced internal diameter which is somewhat greater than the diameter of the collar 71. The axial length of the collar 71 equals that of the central cylinder portion 72. Those smaller-diameter portions 69a, 69a' of the actuator piston 69 which extend axially beyond the collar 71 are surrounded by rings 73 each of which is in sealing engagement with the periphery of the respective smaller-diameter portion 69a, 69a' as well as with the internal surface of the cylinder 70 at the corresponding side of the central portion 72. The collar 71 can move the rings 73 axially of the cylinder 70 toward the respective stops 74 which are shown in the form of internal shoulders of the cylinder 70. Thus, each ring 73 can move axially between an abutment which constitutes the central cylinder portion 72 and the respective stop 74. The axial length of each of the piston portions 69a, 69a' equals the distance between a stop 74 and the nearest axial end of the central cylinder portion or abutment 72.

The annular space which is surrounded by the abutment 72 communicates with the return line RL by way of a fluid-discharging port 75. A first pressure port 76 communicates with the cylinder 70 in the region to the left of the left-hand stop 74, and a second pressure port 77 communicates with the cylinder 70 in the region to the right of the right-hand stop 74. The flow of fluid into the ports 76, 77 is controlled by two check valves 80, 81 which, in turn, are controlled by electromagnetic pilot valves 78, 79. The construction of the source of pressurized fluid (including the parts 1–4 and the high pressure lines 5 and 6) is the same as described in connection with FIG. 1.

The check valve 80 (which is identical with the other check valve 81) has an inlet 82 connected with the high pressure line 6 and an outlet 83 which communicates with the pressure port 76 of the actuator cylinder 70 and is normally sealed from the inlet 82 by a spherical valve element 90 which is biased by a helical spring 90a so that it normally engages an annular seat 90b provided in the body of the check valve 80 between the inlet 82 and outlet 83. The check valve 80 has a second outlet 84 which is connected with the return line RL. The spherical valve element 90 can be moved away from the seat 90b by the cylindrical extension 91 of a plunger 86 which is reciprocably guided in the left-hand portion 85 of the body of the check valve 80.

The body of the check valve 80 is further provided with three axially spaced annular chambers 87, 88 and 89. The chamber 89 communicates with the outlet 83, the chamber 88 communicates with the outlet 84, and the chamber 87 is connected with an outlet of the pilot valve 78. When the valve element 90 engages its seat 90b, the chamber 89 is sealed from the inlet 82.

When the pilot valve 78 is energized in response to a signal from the electronic control unit, it admits pressurized fluid into the chamber 87 of the check valve 80 whereby such fluid exerts pressure against the left-hand end face 87' of the plunger 86 with the result that the plunger moves in a direction to the right and its extension 91 moves the spherical valve element 90 off the seat 90b so that the spring 90a stores additional energy. The extension 91 can engage and displace the valve element 90 after the plunger 86 seals the second outlet 84 (and hence the chamber 88 and the return line RL) from the chamber 89. The latter is then connected with the inlet 82 so that the pressure port 76 receives pressurized fluid from the high pressure line 6. The energization of pilot valve 78 must be preceded by energization of an electromagnetic control valve 94 which can connect the high pressure line 6 with the pilot valves 78 and 79. Thus, in order that the plunger 86 of the check valve 80 may move the spherical valve element 90 off the seat 90b to thus connect the inlet 82 with the pressure port 76, the control valve 94 must be energized with the pilot valve 78 so that the latter can admit pressurized fluid into the chamber 87. As mentioned above, the valves 79 and 81 are respectively identical with the valves 78 and 80.

In order to effect a movement of the double-acting piston 69 in the actuating motor 68 from the illustrated neutral position, for example, in order to move the piston 69 in a direction to the right, as viewed in FIG. 3, the electromagnetic valves 94 and 78 are energized so that the chamber 87 of the check valve 80 receives pressurized fluid which acts against the end face 87' and moves the plunger 86 in a direction toward the spherical valve element 90. During a first stage of its rightward movement, the plunger 86 seals the chamber 88 and second outlet 84 from the chamber 89. The opening of the valve element 90 follows so that the pressurized fluid can flow from the inlet 82 to the outlet 83 and thence into the pressure port 76 for entry into the left-hand chamber of the actuator cylinder 70. The piston 69 begins to move in a direction to the right and its collar 71 pushes the right-hand ring 73 toward and into engagement with the right-hand stop 74 in the cylinder 70. This causes the piston rod 69' to move the displacing hub 42a and the previously selected shifting member or finger 22'', 23'', 24'' or 25'' so that the speed ratio of the transmission is changed as a function of the axial position of the piston rod 9' of the selector motor 7. When the piston 69 is arrested as a result of engagement between the right-hand ring 73 and the right-hand stop 74, the pressure in the outlet 83 of the check valve 80 rises to match the pressure in the inlet 82 whereby the spring 90a is free to expand and returns the spherical valve element 90 into sealing engagement with the seat 90b. The operation of the actuating motor 68 is analogous when the piston 69 is to move in a direction to the left; the electronic control unit then furnishes a signal which energizes the control valve 94 and the pilot valve 79.

If the piston 69 of the actuating motor 68 is to be returned to its neutral position, the electronic control unit furnishes a signal which energizes the control valve 94 simultaneously with the pilot valves 78 and 79. Thus, the pressure ports 76, 77 admit pressurized fluid into the respective chambers of the cylinder 70. That ring 73 which engages the respective stop 74 is then caused to move toward the central cylinder portion or abutment 72 and entrains the collar 71 so that the piston 69 returns to the illustrated neutral position. When the piston 69 reaches such neutral position, the pressure in the outlets 83 of the check valves 80 and 81 matches the pressure in the respective inlets 82 so that the springs 90a of the check valves are free to return the respective spherical valve elements 90 to their sealing positions. This completes the operation which is to be carried out in order to return the piston 69 to its neutral position.

Figure 4:
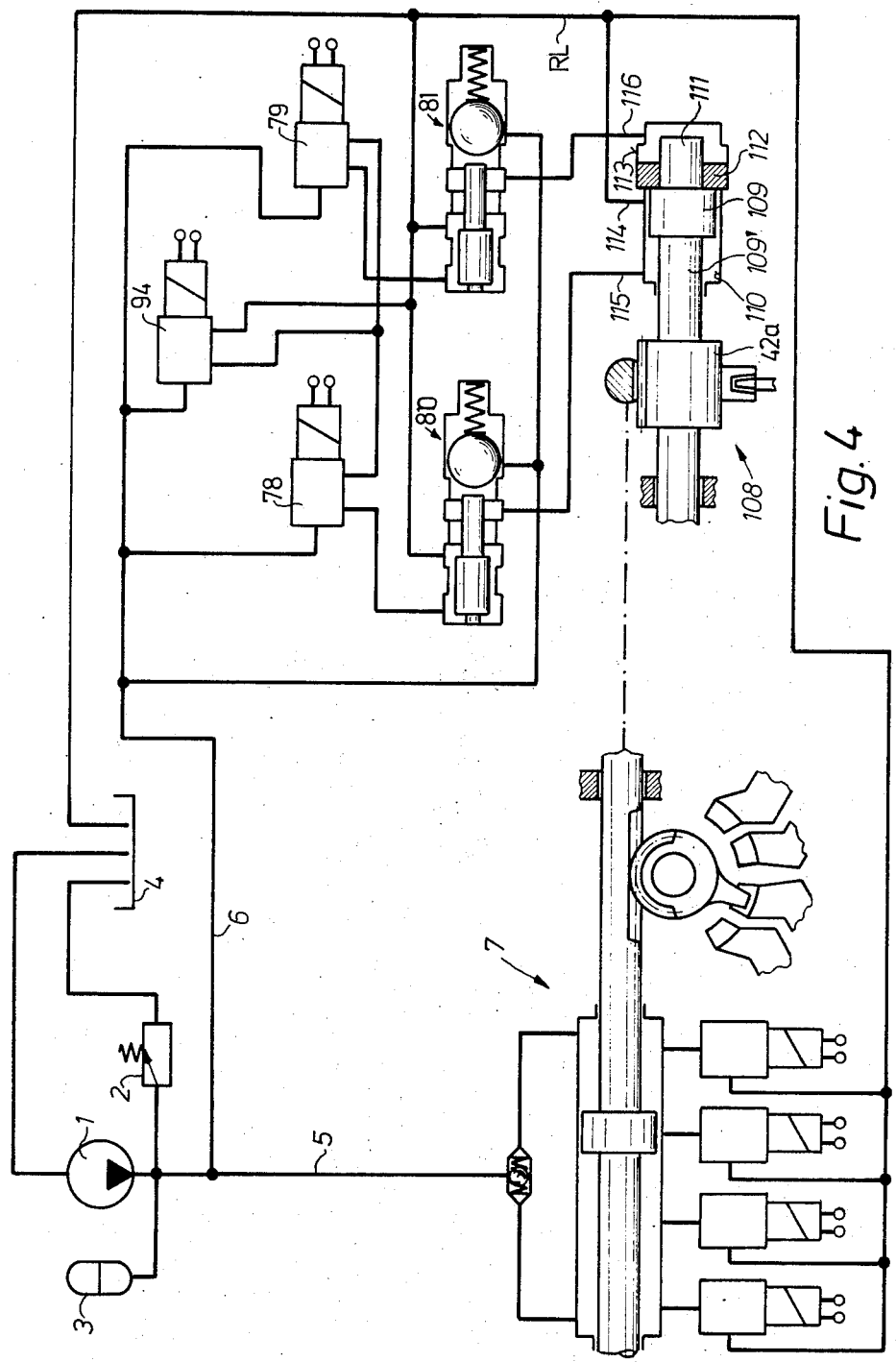
FIG. 4 is a similar view of a fourth gear shifting assembly.

The assembly of FIG. 4 differs from the assembly of FIG. 3 in that it employs a simplified actuating motor 108. The piston rod 109' extends only beyond one axial end of the actuator cylinder 110 and is connected with the displacing hub 42a as well as with a double-acting piston 109 having a cylindrical extension 111 at that side which faces away from the piston rod 109'. The piston 109 is sealingly received in and is reciprocable relative to the left-hand portion of the cylinder 110. The extension 111 carries a ring 112 which is movable axially in a larger-diameter annular recess 113 of the cylinder 110. The internal and external surfaces of the ring 112 are respectively in sealing engagement with the cylinder 110 and extension 111. The axial length of the extension 111 equals the axial length of the recess 113.

A fluid-discharging port 114 which is connected with the return line RL communicates with the interior of the cylinder immediately to the left of the recess 113 so that it is sealed by the piston 109 when the latter assumes the illustrated neutral position. A pressure port 115 communicates with the left-hand end portion of the cylinder 110 and can receive pressurized fluid from a check valve 80. A pressure port 116 communicates with the cylinder 110 to the right of the recess 113 and can receive pressurized fluid from the check valve 81. The check valves 80 and 81 are respectively controlled by pilot valves 78, 79, and the assembly of FIG. 4 further comprises a control valve 94. The operation of this assembly is analogous to that of the assembly shown in FIG. 3. Thus, the piston rod 109' will move in a direction to the right in response to energization of the valves 78, 94, the piston rod 109' will move in a direction to the left in response to energization of the valves 79, 94, and the piston 109 will return to the illustrated neutral position in response to simultaneous energization of the valves 94, 78 and 79.

Figure 5:
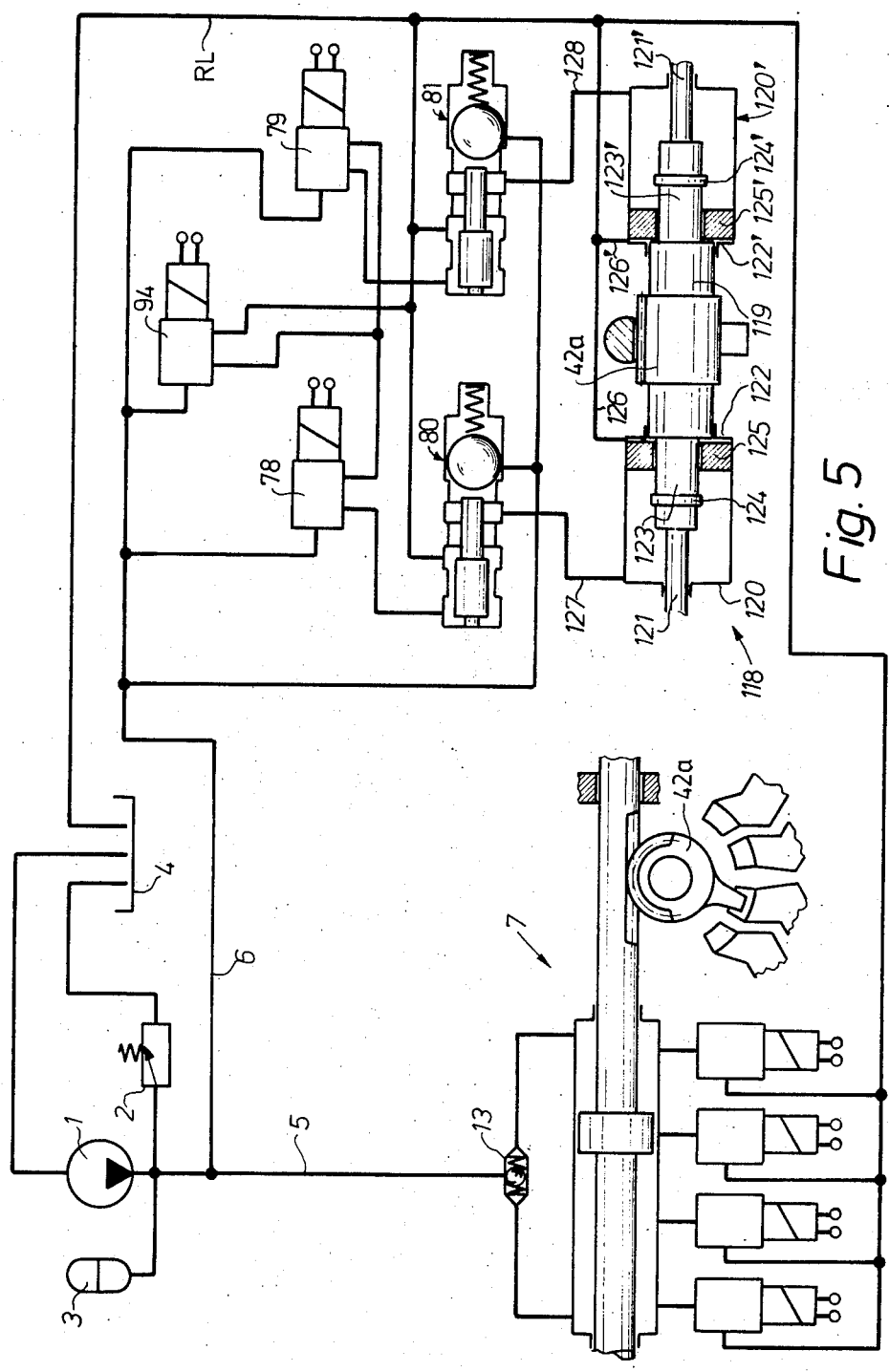
FIG. 5 is a similar view of a fifth gear shifting assembly.

The selector motor 7 of the assembly shown in FIG. 5 is identical with the motor 7 of FIG. 2, and the source of pressurized fluid in the assembly of FIG. 5 is identical with the source of FIG. 1. The actuating motor 118 of FIG. 5 has two discrete coaxial cylinders 120, 120' and a twin multistage actuator piston 119. The stages 123, 123' of the piston 119 are respectively provided with and guided by piston rods 121, 121' which respectively extend through and beyond the left-hand and right-hand (outer) ends of the cylinders 120, 120'. Those (inner) end walls of the cylinders 120, 120' which are nearer to each other constitute two stops 122, 122' for two rings 125, 125' which are sealingly guided and reciprocable in the cylinders 120, 120' and respectively sealingly surround the stages 123, 123' of the piston 119. The stages 123, 123' are respectively provided with collars 124, 124'. The collars 124, 124' respectively serve to entrain the rings 125, 125' to the illustrated inner end positions when the piston 119 is respectively caused to move in a direction to the right and to the left, as viewed in FIG. 5. Fluid-discharging ports 126, 126' of the cylinders 120, 120' communicate with each other and with the return line RL. These return ports are respectively adjacent to or provided in the end walls or stops 122, 122'. The left-hand end of the cylinder 120 communicates with a first pressure port 127, and the right-hand end of the cylinder 120' communicates with a second pressure port 128.

The valves 94, 78, 79 and 80, 81 are identical with the similarly referenced valves of FIG. 3. The operation of the assembly of FIG. 5 is analogous to that of FIG. 3 or FIG. 4, i.e., the displacing hub 42a will move in a direction to the right in response to opening of the valves 94 and 78, the hub 42a will move in a direction to the left in response to opening of the valves 94, 79, and the piston 119 will reassume the illustrated neutral position in response to simultaneous opening of the valves 94, 78 and 79. It will be noted that the hub 42a is mounted directly on the piston 119 intermediate the cylinders 120, 120'. This hub can rotate on but is movable axially with the piston 119. It is evident, however, that the hub 42a can be mounted on the piston rod 121 or 121'.

Figure 6:
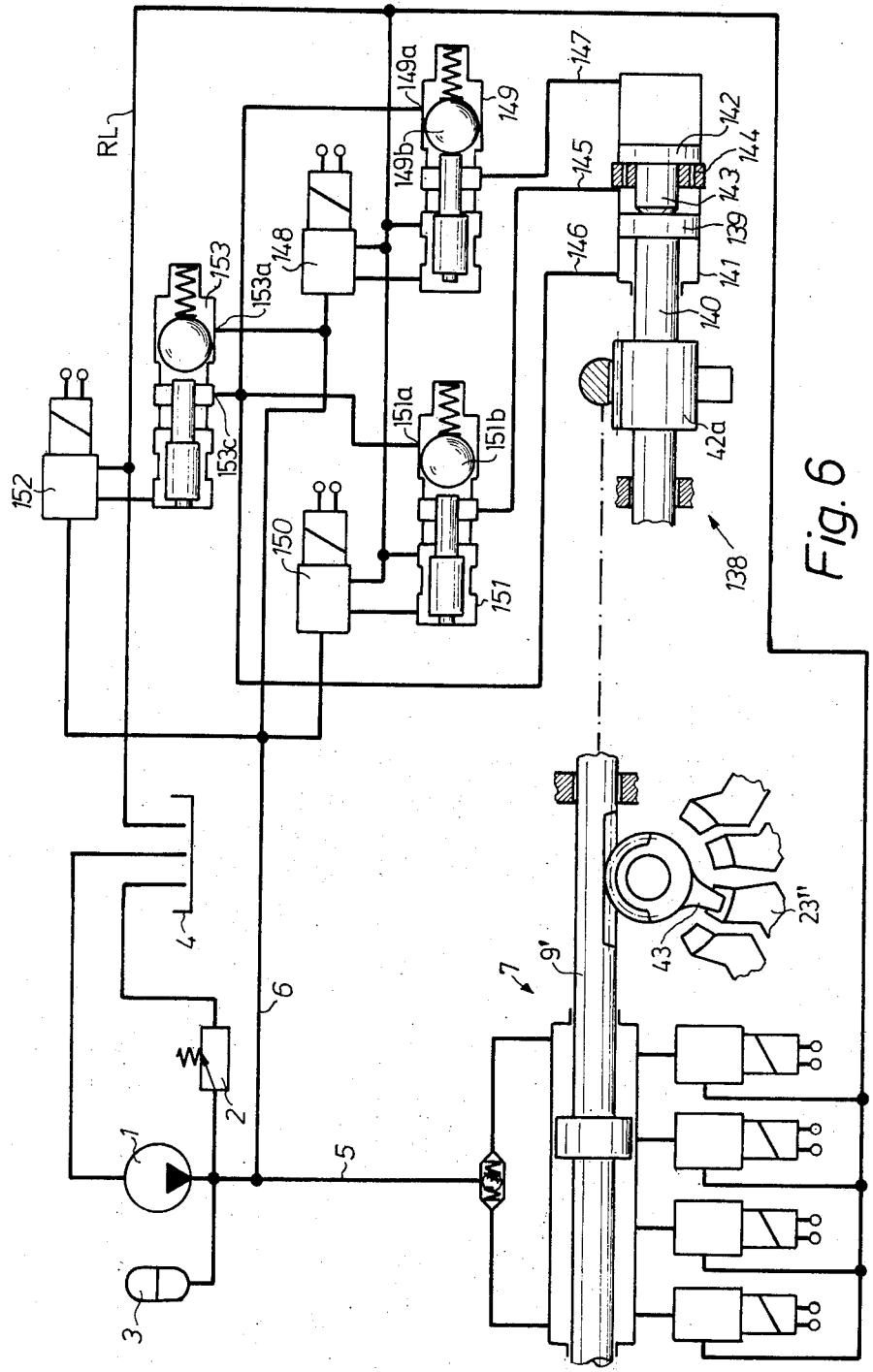
FIG. 6 is a similar view of a sixth gear shifting assembly.

The assembly of FIG. 6 employs a select motor 7 which is identical with the motor 7 of FIG. 2 and a modified actuating motor 138. The actuator cylinder 141 of the motor 138 has a main piston 139 which is connected with a piston rod 140 serving to move the displacing hub 42a. The piston rod 140 extends only beyond one axial end of the cylinder 141. The main piston 139 is in sealing engagement with the internal surface of the cylinder 141, and the right-hand portion of the cylinder 141 accommodates an auxiliary piston 142 having a smaller-diameter extension 143 which is surrounded by a fixedly mounted annular fluid-permeable partition 144. The peripheral surface of the auxiliary piston 142 is in sealing engagement with the internal surface of the cylinder 141 and the partition 144 is provided with preferably axially parallel channels, bores or passages for the fluid.

A first fluid-admitting port 145 communicates with the cylinder 141 immediately to the left of the partition 144 between the pistons 139, 143, and a second port 146 can admit pressurized fluid at the left-hand end of the cylinder 141, i.e., at the left-hand side of the main piston 139. A third port 147 can admit fluid to the cylinder 141 in the region located to the right of the auxiliary piston 142. The port 147 is controlled by a normally open check valve 149 which is controlled by a normally open electromagnetic pilot valve 148. The construction of the valves 148, 149 is respectively identical to that of the valves 78, 80 shown in FIG. 3. The pilot valve 148 must be energized in order to close the check valve 149.

The port 145 is connected with an outlet of a second check valve 151 which is normally closed and is controlled by a normally deenergized electromagnetic pilot valve 150. The valves 150, 151 are respectively identical with the valves 78, 80 of FIG. 3. The pilot valve 150 must be energized in order to effect an opening of the check valve 151.

The inlets 149a, 151a of the check valves 149, 151 are respectively controlled by spherical valve elements 149b, 151b. These inlets communicate with the port 146 of the cylinder 141 and with the outlet 153c of a check valve 153 which is identical with the check valve 80 of FIG. 3 and is controlled by an electromagnetic pilot valve 152. The pilot valve 152 is normally closed, i.e., it must be energized in order to effect an opening of the check valve 153 so that the port 146 and inlets 149a, 151a then receive pressurized fluid from the outlet 153c. The inlet 153a of the check valve 153 is connected with the high pressure line 6 and this inlet can admit pressurized fluid to the outlet 153c in response to energization of the pilot valve 152.

The operation of the assembly of FIG. 6 is as follows.

The angular position of the hub 42a is selected by the motor 7 in the same way as described in connection with FIG. 2. As shown, the motor 7 has caused the piston rod 9' to move the hub 42a to an angular position in which the fork 43 is ready to move the shifting member or finger 23''.

In order to move the piston rod 140 of the actuating motor 138 in a direction to the left, as viewed in FIG. 6, the electronic control unit furnishes a signal which results in energization of the pilot valve 152 simultaneously with energization of the pilot valve 150. The ports 145, 146, 147 are then connected with the high pressure line 6. The sum of pressures upon the auxiliary piston 142 is zero but the main piston 139 moves in a direction to the left because the effective area of its right-hand surface is larger than the effective area of its left-hand surface.

If the main piston 139 is to move to its right-hand operative position, the pilot valves 152 and 148 are energized. The ports 145 and 147 are then connected with the return line RL by way of the check valves 151 and 149. The port 146 admits pressurized fluid into the cylinder chamber which is located to the left of the main piston 139 so that the latter moves in a direction to the right.

The pilot valve 152 is energized alone if the main piston 139 is to be returned to its neutral position. If the main piston 139 was located in its right-hand operative position, it is returned to the neutral position by the auxiliary piston 142 and its extension 143. If the main piston 139 was located in its left-hand operative position, it is returned to the neutral position by fluid which is admitted via port 146. The main piston 139 reaches the neutral position when it abuts against the extension 143 while the auxiliary piston 142 abuts against the partition 144.

The improved gear shifting assembly is susceptible of many additional modifications. For example, the assembly of FIG. 1 can utilize one of the actuating motors which are shown in FIGS. 2-6. It is also within the purview of the invention to replace the selector motor 7 and/or the actuating motor 8, 68, 108, 118 or 138 with a hydraulic or pneumatic motor having a rotary (rather than reciprocable) piston. A rotary piston motor may comprise a rotary output shaft which carries a piston arranged to turn in a concentric annular chamber of the cylinder. The admission of pressurized fluid into and the evacuation of fluid from the cylinder of the rotary piston motor can be controlled by a system of valves similar to those described in connection with FIGS. 1 to 6. If the actuating motor 8 of FIG. 1 is replaced with a rotary piston motor, the rotary output shaft of such motor can be directly coupled to the lever 28 of FIG. 1. If the rotary piston motor replaces one of the actuating motors shown in FIGS. 2-6, the gear shifting assembly is provided with suitable means for transforming the angular movement of the output shaft of such motor into an axial movement of the displacing hub 42a. Analogously, if the selector motor 7 is replaced with a rotary piston motor, the output shaft of such rotary piston motor can be directly coupled with the displacing hub 42a.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members, said cylinder means being provided with two fluid-admitting pressure ports located at the opposite sides of said piston means and with a plurality of fluid-discharging ports located in the path of movement of said piston means; fluid-operated actuating motor means having second cylinder means and second piston means movable from a neutral position to at least one operative position to thereby actuate the selected shifting member by way of said displacing means; a source of pressurized fluid; and automatic control means including remote control operated valve means for regulating the flow of fluid which is furnished by said source to and from said cylinder means, said valve means including a directional control valve interposed between said pressure ports and said source and arranged to admit pressurized fluid to the pressure port at the higher-pressure side of said first piston means, and normally closed electromagnetic shutoff valves for said discharging ports whereby said first piston means automatically moves to a position in which it seals that discharging port which was free to discharge fluid from said first cylinder means in response to opening of the respective shutoff valve.

2. An assembly as defined in claim 1, wherein said first and second piston means are respectively movable in first and second planes which are at least substantially normal to each other.

3. An assembly as defined in claim 2, wherein each of said piston means comprises at least one double-acting piston and said second piston means is movable between two operative positions, said neutral position being located between said operative positions.

4. An assembly as defined in claim 1, wherein said valve means further comprises a normally closed solenoid operated safety valve interposed between said source and said directional control valve.

5. An assembly as defined in claim 1, wherein said first piston means is reciprocable between said positions and comprises rotary and reciprocable piston rod means extending beyond said first cylinder means, said shifting members being rotatable about the axis of said piston rod means and having aligned openings therefor, said displacing means being provided on said piston rod means and being received in the opening of the selected shifting member in the corresponding position of said first piston means whereby said displacing means can transmit torque to the selected shifting member, said second piston means being arranged to rotate said piston rod means in response to movement relative to said second cylinder means.

6. An assembly as defined in claim 5, wherein said second piston means comprises second piston rod means extending beyond and reciprocable relative to said second cylinder means, and further comprising means for rotating the piston rod means of said first piston means in response to lengthwise movement of said second piston rod means.

7. An assembly as defined in claim 6, wherein said means for rotating comprises a lever rotatable with and movable axially of said first mentioned piston rod means, said second piston rod means having a recess receiving a portion of said lever to pivot the latter and to thereby turn said first mentioned piston rod means in response to axial movement of said second piston means relative to said second cylinder means.

8. An assembly as defined in claim 7, wherein said piston rod means are normal to and cross in space with each other, said portion of said lever being of at least substantially spherical shape.

9. An assembly as defined in claim 7, wherein said first mentioned piston rod means comprises a splined shaft which is movable axially relative to and receives torque from said lever.

10. An assembly as defined in claim 1, wherein said displacing means is rotatable into register with selected shifting members in response to axial movement of said first piston means relative to said first cylinder means, said second piston means being arranged to move said displacing means axially and to thereby actuate the selected shifting member in response to movement of said second piston means relative to said second cylinder means.

11. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members, said piston means comprising piston rod means having an elongated toothed rack and said displacing means comprising a gear meshing with said rack, said displacing means being rotatable into register with selected shifting members in response to axial movement of said piston means relative to said cylinder means; fluid-operated actuating motor means having second cylinder means and second piston means movable from a neutral position to at least one operative position to thereby actuate the selected shifting member by way of said displacing means, said second piston means being arranged to move said displacing means axially and to thereby actuate the selected shifting member in response to movement of said second piston means relative to said second cylinder means; a source of pressurized fluid; and automatic control means including remote control operated valve means for regulating the flow of fluid which is furnished by said source to and from said cylinder means.

12. An assembly as defined in claim 11, wherein said second piston means is movable axially relative to said second cylinder means and at right angles to the axis of said first mentioned piston rod means, said gear being secured to said second piston rod means so that the latter rotates in response to axial movement of said rack and moves axially with said second piston means.

13. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to at least one operative position to thereby actuate the selected shifting member by way of said displacing means, said second cylinder means comprising two fluid-admitting pressure ports at the opposite sides of said second piston means and a plurality of fluid-discharging ports located in the path of movement of said second piston means; a source of pressurized fluid; and automatic control means including remote control operated valve means for regulating the flow of fluid which is furnished by said source to and from said cylinder means, said valve means including a directional control valve interposed between said pressure ports and said source and arranged to admit pressurized fluid to the pressure port at the higher-pressure side of said second piston means, and normally closed shutoff valves for said discharging ports whereby said piston means automatically moves to a position in which it seals that discharging port which is free to discharge fluid from said second cylinder means in response to opening of the respective shutoff valve.

14. An assembly as defined in claim 13, wherein said second piston means is movable between two operative positions located at the opposite sides of said neutral position thereof, said discharging ports including a first port which is sealed by said second piston means in said neutral position thereof and two additional ports which are respectively sealed by said second piston means in the one and the other operative position thereof.

15. An assembly as defined in claim 13, wherein said shutoff valves are solenoid-operated valves.

16. An assembly as defined in claim 13, wherein each of said shutoff valves comprises a normally closed check valve and a solenoid-operated pilot valve which is energizable to thereby open the respective check valve.

17. An assembly as defined in claim 16, wherein each of said check valves comprises a substantially spherical valve element which normally dwells in a sealing position and a plunger which is movable axially in response to energization of the respective pilot valve to thereby move said valve element from said sealing position.

18. An assembly as defined in claim 17, wherein each of said check valves further comprises a body which defines a seat for said valve element and includes a portion which guides said plunger for axial movement, one end of said plunger being subjected to fluid pressure in response to energization of the respective pilot valve, said body further having an inlet in communication with the respective discharging port and an outlet, said inlet and outlet being located at the opposite sides of said seat so as to be sealed from each other in the sealing position of said valve element and each of said check valves further comprising means for biasing said valve element against the respective seat.

19. An assembly as defined in claim 13, wherein said valve means further comprises a normally closed solenoid-operated safety valve interposed between said source and said directional control valve.

20. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to two operative positions to thereby actuate the selected shifting member by way of said displacing means, said second cylinder means comprising a substantially centrally located abutment, two stops located at the opposite sides of and axially spaced from said abutment, a pair of fluid-admitting pressure ports each adjacent to one of said stops and a fluid-discharging port in the region of said abutment, said second piston means comprising a centrally located collar having a diameter smaller than the internal diameter of said abutment and a pair of smaller-diameter cylindrical portions flanking said collar, said collar being in register with said abutment in said neutral position of said second piston means and said actuating motor further comprising a pair of rings each surrounding and slidable on one of smaller-diameter portions, said collar being arranged to maintain one of said rings in sealing engagement with one of said pressure ports in one of said operative positions of said second piston means and said collar being arranged to maintain the other of said rings in sealing engagement with the other pressure port in the other of said operative positions of said second piston means; a source of pressurized fluid; and automatic control means including remote control operated valve means for regulating the flow of fluid which is furnished by said source to and from said cylinder means.

21. An assembly as defined in claim 20, wherein said second piston means comprises a piston rod which extends beyond said second cylinder means and rotatably supports said displacing means, said displacing means being arranged to share the axial movements of said second piston means.

22. An assembly as defined in claim 20, wherein the axial length of said abutment equals the axial length of said collar and the distance between said abutment and either one of said stops equals the axial length of one of said smaller-diameter portions, the axial length of each of said rings being less than said distance and said rings having external surfaces in sealing engagement with the adjacent portions of the internal surface of said second cylinder means, said pressure ports being outwardly adjacent to the respective rings.

23. A gear shifting assembly for a change-speed transmission of the type having a plurality of shifting members actuatable to thereby set the transmission into different speed positions, said assembly comprising displacing means movable into register with each of said shifting members, a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to first and second operative positions to thereby actuate the selected shifting member by way of said displacing means, said second piston means comprising a piston rod extending axially through and beyond one end of said second cylinder means, a cylindrical extension extending toward the other end of said second cylinder means and a peripheral surface in sealing engagement with the internal surface of said second cylinder means, said actuating motor means further comprising a ring sealingly surrounding said extension and sealingly engaging the internal surface of an annular recess of said second cylinder means, the axial length of said recess being equal to that of said extension and said second cylinder means having a first fluid-admitting pressure port adjacent to said other end thereof, a second fluid-admitting pressure port adjacent to said one end thereof, and a fluid-discharging port adjacent to that axial end of said recess which is remote from said other end of said second cylinder means, said second piston means being arranged to seal said discharging port in said neutral position thereof and being movable from said neutral position to said first and second operative positions thereof in response to admission of pressurized fluid by way of said first and second pressure port, respectively; a source of pressurized fluid; and automatic control means including remote control operated valve means for regulating the flow of fluid which is furnished by said source to and from said cylinder means.

24. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to at least one operative position to thereby actuate the selected shifting member by way of said displacing means, said second cylinder means comprising discrete coaxial first and second cylinders and said second piston means constituting a twin piston having first and second stages respectively reciprocable in said first and second cylinders, each of said cylinders having an inner end nearer to and an outer end remote from the other cylinder and each of said stages having a collar located in the respective cylinder and remote from the respective inner end, said actuating motor means further comprising first and second rings sealingly surrounding and slidable on said first and second stages between the respective collars and the respective inner ends, said rings having peripheral surfaces in sealing engagement with the internal surfaces of the respective cylinders and each of said cylinders having a fluid-admitting pressure port adjacent to the respective outer end and a fluid-discharging port adjacent to the respective inner end; a source of pressurized fluid; and automatic control means including remote control operated valve means for regulating the flow of fluid which is furnished by said source to and from said cylinder means.

25. An assembly as defined in claim 24, wherein said discharging ports communicate with each other and said displacing means is rotatable on and axially movable with said second piston means intermediate said first and second cylinders.

26. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to at least one operative position to thereby actuate the selected shifting member by way of said displacing means, said second cylinder means comprising first and second fluid-admitting pressure ports and said second piston means being movable between said neutral position and two operative positions whereby one of said pressure ports admits pressurized fluid to move said second piston means to one of said operative positions and the other pressure port admits pressurized fluid to move said second piston means to the other operative position; a source of pressurized fluid; and automatic control means including remote control operated valve means for regulating the flow of fluid which is furnished by said source to and from said cylinder means, said valve means comprising normally closed first and second check valves respectively interposed between said source and said first and second ports and normally closed discrete electromagnetic pilot valves for said check valves.

27. An assembly as defined in claim 26, wherein each of said check valves comprises a body having an inlet for pressurized fluid, an outlet connected with the respective pressure port, a valve element normally assuming a sealing position in which said inlet is sealed from said outlet, and a plunger movable axially in said body to thereby move said valve element from said sealing position, said plunger being arranged to move axially in response to energization of the respective pilot valve.

28. An assembly as defined in claim 26, wherein said valve means further comprises normally closed electromagnetic control valve means interposed between said source and said check valves.

29. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to at least one operative position to thereby actuate the selected shifting member by way of said displacing means, said second piston means comprising a main piston and an auxiliary piston both sealingly received in and reciprocable relative to said second cylinder means, said auxiliary piston having a smaller-diameter extension extending toward said main piston and said main piston having a piston rod extending beyond one end of said second cylinder means in a direction away from said auxiliary piston, said actuating motor means further comprising a fluid-permeable partition provided in said second cylinder means to guide said extension and said second cylinder means having a first fluid-admitting port located at that side of said auxiliary piston which is remote from said main piston, a second fluid-admitting port located between said pistons, and a third fluid-admitting port adjacent to said one end of said second cylinder means; a source of pressurized fluid; and automatic control means including remote control operated valve means for regulating the flow of fluid which is furnished by said source to and from said cylinder means.

30. An assembly as defined in claim 29, wherein said valve means comprises a first check valve for admitting pressurized fluid to said first port, a normally deenergized first electromagnetic pilot valve which is energizable to thereby actuate said first check valve, a second check valve interposed between said source and said second port, a normally deenergized second electromagnetic pilot valve which is energizable to actuate said second check valve, a third check valve interposed between said third port and said source, and a normally deenergized third electromagnetic pilot valve which is energizable to actuate said third check valve.

31. An assembly as defined in claim 30, wherein said third check valve is arranged to control the admission of pressurized fluid from said source to said first and second check valves.

32. An assembly as defined in claim 31, wherein said first check valve is normally open and is arranged to close in response to energization of said first pilot valve, said second and third check valves being normally closed and being arranged to respectively open in response to energization of said second and third pilot valves.

33. A gear shifting assembly for a change-speed transmission of the type having a plurality of shifting members actuatable to thereby set the transmission into different speed positions, said assembly comprising displacing means movable into register with each of said shifting members; a fluid-operated selector motor including first cylinder means and first piston means movable in said cylinder means between a plurality of positions to thereby effect a movement of said displacing means into register with selected shifting members; fluid-operated actuating motor means having second cylinder means and second piston means movable from a neutral position to at least one operative position to thereby actuate the selected shifting member by way of said displacing means, said second cylinder means having at least one fluid-admitting pressure port; a source of pressurized fluid; and automatic control means including remote control operated valve means for regulating the flow of fluid which is furnished by said source to and from said cylinder means, said valve means comprising a check valve interposed between said source and said port and having a body provided with a seat, an inlet for pressurized fluid and an outlet connected with said port, a valve element movable into sealing engagement with said seat to thereby seal said inlet from said outlet, and a plunger movable in said body from an idle position to thereby move said valve element from said sealing position, said body further having a chamber adjacent to that axial end of said plunger which is remote from said valve element and said valve means further comprising pilot valve means actuatable to admit pressurized fluid into said chamber to thereby effect a movement of said valve element from said sealing position.

34. An assembly as defined in claim 33, wherein said body of said check valve is further provided with a fluid-discharging second outlet which communicates with said first mentioned outlet in the sealing position of said valve element and is sealed from said first mentioned outlet by said plunger in response to admission of pressurized fluid into said chamber, said check valve further comprising means for biasing said valve element to said sealing position.

35. An assembly as defined in claim 34, wherein said body is further provided with a second chamber which communicates with said first mentioned outlet and a third chamber which communicates with said second outlet, said chambers being spaced from each other as considered in the axial direction of said plunger and said seat being provided between said inlet and said second chamber.

36. An assembly as defined in claim 1, further comprising manually operated means for moving at least one of said piston means in the event of failure of said valve means.

37. An assembly as defined in claim 36, wherein said one piston means is provided with a piston rod extending beyond the respective cylinder means and said manually operated means is separably secured to said piston rod without the respective cylinder means.

* * * * *